US009828483B1

(12) United States Patent
Guenthner et al.

(10) Patent No.: US 9,828,483 B1
(45) Date of Patent: *Nov. 28, 2017

(54) APPARATUS FOR MANUFACTURING MICROCONDUIT NETWORKS FORMED BY ELECTROSPINNING TECHNIQUES

(71) Applicant: The United States of America, as Represented by the Secretary of the Navy, Washington, DC (US)

(72) Inventors: Andrew J. Guenthner, Lancaster, CA (US); David Michael Hess, Redondo Beach, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/869,479

(22) Filed: Sep. 29, 2015

Related U.S. Application Data

(62) Division of application No. 13/714,892, filed on Dec. 14, 2012, now Pat. No. 9,174,422, which is a division of application No. 12/694,090, filed on Jan. 26, 2010, now Pat. No. 8,354,052.

(51) Int. Cl.
| | |
|---|---|
| *B29C 39/18* | (2006.01) |
| *B29C 67/20* | (2006.01) |
| *D04H 1/728* | (2012.01) |
| *C08J 9/26* | (2006.01) |
| *D01D 5/00* | (2006.01) |
| *D06M 15/233* | (2006.01) |

(52) U.S. Cl.
CPC .............. *C08J 9/26* (2013.01); *B29C 39/18* (2013.01); *B29C 67/202* (2013.01); *D01D 5/0061* (2013.01); *D04H 1/728* (2013.01); *D06M 15/233* (2013.01); *C08J 2325/06* (2013.01); *D10B 2321/121* (2013.01)

(58) Field of Classification Search
CPC ........ D04H 1/728; B29C 39/18; B29C 67/20; B29C 67/202
See application file for complete search history.

(56) References Cited

U.S. PATENT DOCUMENTS

| | | | |
|---|---|---|---|
| 5,011,566 A * | 4/1991 | Hoffman | B22F 1/004 216/58 |
| 6,113,722 A * | 9/2000 | Hoffman | B81C 99/0085 156/155 |
| 9,174,422 B1 * | 11/2015 | Guenthner | B29C 67/20 |
| 2002/0081732 A1 | 6/2002 | Bowlin et al. | |
| 2003/0026985 A1 | 2/2003 | Greiner et al. | |

* cited by examiner

*Primary Examiner* — Yogendra Gupta
*Assistant Examiner* — Joseph Leyson
(74) *Attorney, Agent, or Firm* — Charlene A. Haley

(57) ABSTRACT

A microconduit network structure and methods for making the same. One aspect of the invention relates to a microconduit network structure, including: a solid or semi-solid matrix having at least one interconnected web of filaments formed within the matrix; and wherein at least one interconnected web of filaments having diameters of about 10 nm to about 1 mm.

1 Claim, 3 Drawing Sheets

APPARATUS FOR MANUFACTURING MICROCONDUIT NETWORKS FORMED BY ELECTROSPINNING TECHNIQUES

CROSS-REFERENCE TO RELATED APPLICATIONS

This is a this is a divisional patent application, claiming benefit of divisional patent application Ser. No. 13/714,892 filed on Dec. 14, 2012, now U.S. Pat. No. 9,174,422, which claims the benefit of, parent application Ser. No. 12/694,090 filed on Jan. 26, 2010, now U.S. Pat. No. 8,354,052, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention generally relate to microconduit networks, and more specifically, microconduit networks formed by electrospun polymer templates.

BACKGROUND OF THE INVENTION

From U.S. Pat. No. 6,858,057 "The term "electrospun fibers" is recognized by those having ordinary skill in the art and includes those fibers produced by the processes of U.S. Pat. No. 3,994,258 to Simm and U.S. Pat. No. 4,230,650 to Guignard. The processes provide methods to produce fibers from either a molten polymer or a polymer in a solution that is drawn within an electrostatic field obtaining fine fibers of 2 to 5 microns."

Electrospun fiber mats have been used in the manufacture of contact lenses (U.S. Pat. No. 7,563,396), as porous scaffold media for cell and tissue growth (U.S. Pat. No. 6,592,623; U.S. Pat. No. 7,235,295; U.S. Pat. No. 7,531,503), as sensors and biosensors with high surface area (U.S. Pat. No. 7,264,762; U.S. Pat. No. 7,485,591), as field emitting electrodes (U.S. Pat. No. 7,438,622), as porous and coating materials for implanted medical devices (U.S. Pat. No. 6,885,956; U.S. Pat. No. 6,889,166; U.S. Pat. No. 6,889,374; U.S. Pat. No. 7,115,220; U.S. Pat. No. 7,244,272; U.S. Pat. Nos. 7,416,559 and 7,413,575), as static dissipating media (U.S. Pat. No. 7,381,664), filters (U.S. Pat. No. 6,743,273; U.S. Pat. No. 6,858,057; U.S. Pat. No. 6,924,028; U.S. Pat. No. 7,008,465; U.S. Pat. No. 7,070,640; U.S. Pat. No. 7,090,712; U.S. Pat. No. 7,090,715; U.S. Pat. No. 7,179,317; U.S. Pat. No. 7,192,434; U.S. Pat. No. 7,220,271; U.S. Pat. No. 7,290,672; U.S. Pat. No. 7,270,693; U.S. Pat. No. 7,316,723; U.S. Pat. No. 7,318,852; U.S. Pat. No. 7,318,853), biodegradable absorbents (U.S. Pat. No. 7,172,765; U.S. Pat. No. 7,309,948), separators for batteries (U.S. Pat. No. 7,279,251), as electrodes for batteries and fuel cells (U.S. Pat. No. 7,229,944), as reinforcements (U.S. Pat. No. 6,265,333; U.S. Pat. No. 7,244,116), as membranes (U.S. Pat. No. 6,800,155; U.S. Pat. No. 7,109,136), and as catalyst beds (U.S. Pat. No. 6,916,758).

There are US Patents also involve polymer templating processes. U.S. Pat. No. 7,229,944 by Shao-Horn et al. describes how interconnected electrospun polymer fibers are used as a template for carbon fibers through graphitization processes, and how catalytic particles deposited into the nanofibers subsequently grow to desirable sizes. The patent does not describe the use of electrospun fibers as templates for a structure with low yet continuous porosity.

U.S. Pat. No. 7,482,287 by Khatri et al. describes a templating process in which a polymer nanofiber is coated with a sol-gel ceramic precursor. The polymer fiber is then removed and the result is a ceramic fiber of controlled diameter. The fibers so formed have no porosity, nor is interconnection a key feature of the polymer template. The resulting process could not be used to form microconduit networks due to the lack of interconnection and the apparent compacting of the void formed by removing the polymer.

U.S. Pat. No. 7,449,165 by Dai et al. describes a templating process for chromatographic columns in which structures having controlled micro- and meso-porosity are formed by templating particles. These pores are interconnected and the structure is mechanically robust, however, the porosity is not minimized while maintaining interconnection. Thus, the mechanical properties are not optimal. For chromatography applications, the required pore volume is usually not minimized, in order to reduce the overall size of the column.

U.S. Pat. No. 7,419,772 by Watkins et al. describes a templating process involving block copolymers. However, a fully interconnected structure would require a porosity in easily in excess of 20 vol % due to the features of ordered block copolymer geometry. U.S. Pat. No. 7,190,049 discloses a similar method for producing arrays of nanocylinders. These arrays do not involve extensive interconnection between individual cylinders. U.S. Pat. No. 7,189,435 describes a similar process in combination with lithographic techniques. The porosity in such a structure would not be homogeneously distributed. The resultant inhomogeneity would typically lead to inferior mechanical properties.

U.S. Pat. No. 7,345,002 by Schaper disclosed a method for replicating polymer microstructures. All such replication and transfer methods (see, for example, U.S. Pat. No. 6,849,558) involve surface topography only, and cannot be used to product a fully three-dimensional network of embedded pores. U.S. Pat. No. 7,186,355 by Swager describes compositions involving nanoscopic pathways. These pathways are not hollow and, though they can conduct ions or electrons, cannot transport nanoparticles, nor could they transport fluids rapidly.

There are patents involving photonic crystals and/or ordered nanopore arrays. These involve templating with close packed polymer structures (needed to create the regular array) and therefore involve a much higher level of porosity. U.S. Pat. No. 6,929,724 (in addition to numerous other patents and publications, for example U.S. Pat. No. 6,649,083) disclose methods for creating porous structures using colloids as templates. Colloidal templates usually produce non-interconnected pores unless the porosity is greatly in excess of 20 vol %. The sparse, interconnected, highly branched network templates formed by electrospun fibers are not stable geometries for known colloidal materials. The same distinctions apply with respect to numerous patents involving lyotropic liquid crystalline materials used during templating processes.

U.S. Pat. No. 6,176,874 discloses the use of solid freeform fabrication techniques such as Stereolithography (SLA), selective laser sintering (SLS), ballistic particle manufacturing (BPM), fusion deposition modeling (FDM), and three dimensional printing (3DP) to form vascular templates having a the characteristics of electrospun fiber templates. These techniques are limited in the spatial resolution of structures that may be produced in a practical time period, and would generally be unsuitable for continuous production of microconduit network structures.

U.S. Pat. No. 5,522,895 describes a method of using a porous but mechanically strong template for the purpose of growing bone. The porosity is explicitly stated to be from 20% to 50% (by volume), the porosity is gradually replaced by living tissue, thereby aiding in the long-term retention of mechanical properties, and the strength and stiffness of the system are specified in terms of exceeding an absolute threshold, rather than being near optimal.

Despite the wide variety of patents cited above, there is no known patent or publicly available literature that describes any embodiment below, compatible with high-speed mass production, for fabricating a microconduit network structure, that is, a series of highly interconnected pores or channels in which the total volume fraction occupied by pores is on the order of 10% or less. The low porosity of the microconduit network structure combined with the small diameter of the pores provides for significant benefits in the mechanical properties of porous structures while permitting the rapid transport or circulation of fluids within the structure.

It is to be understood that the foregoing is exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

Figure 1A:
FIGS. 1A-C are cross-sectional views of the microconduit template FIG. 1A, shown as embedded in structure FIG. 1B, and shown after extraction FIG. 1C, according to embodiments of the invention.
Figure 1B:
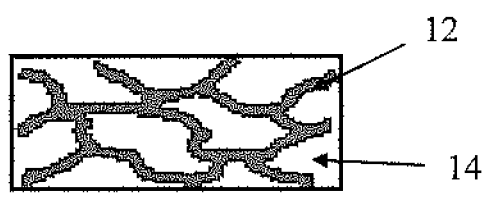
Figure 1C:
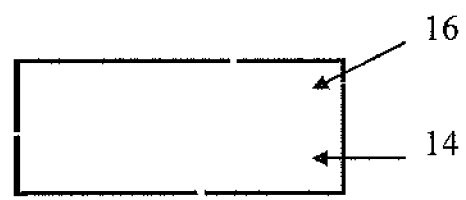
Figure 2:
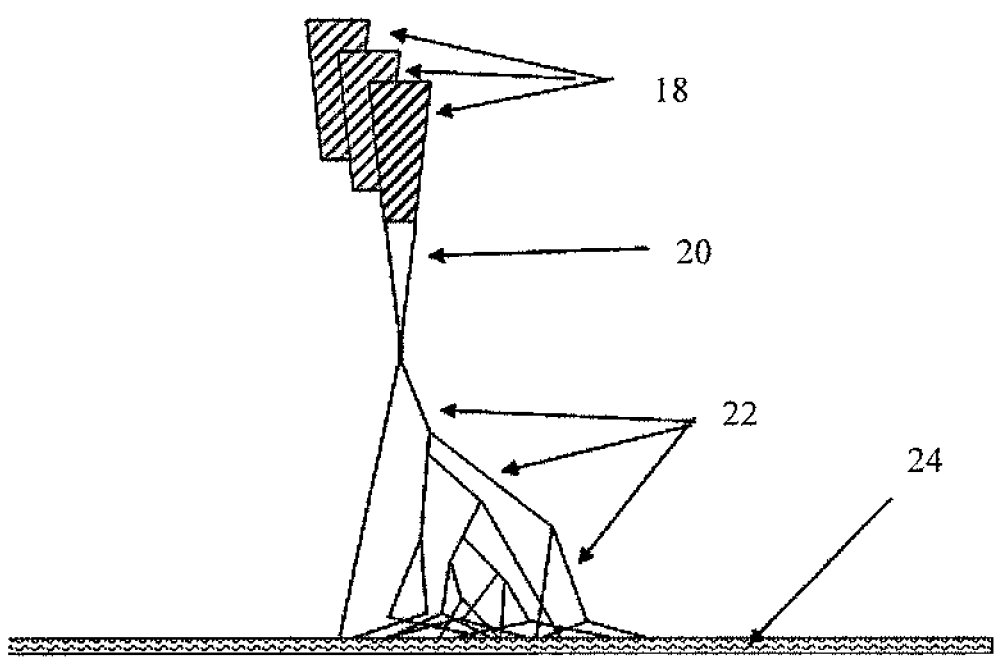
FIG. 2 is a lateral view of an electrospinner orifice using electrified jets of polymer to form unstable filaments of polymer solution on a ground lane and/or carrier substrate, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention relates to microconduit network structures and methods for making the same. An aspect of the invention relates to a process for manufacturing microconduit network structures, including: providing a set of electrospinning orifices associated with an effective amount of solution; maintaining the orifices at a desired voltage to a grounding plane; inducing opposite electrical charges from the voltage to electrify jets of the solution and the jets of solution accelerate to and on the grounding plane transforming the solution into branched webs of filaments; depositing at least one interconnected branched webs of filaments on a carrier substrate; dispensing the solution; adding a matrix precursor fluid into the branched webs of filaments from the dispensing mechanism; solidifying the matrix fluid; and extracting or removing the branched webs of filaments from the matrix.

Another aspect of the invention relates to a microconduit network structure, including: a solid or semi-solid matrix having at least one interconnected web of filaments formed within the matrix; and wherein at least one interconnected web of filaments having diameters of about 10 nm to about 1 mm. Other aspects of the invention relates to an apparatus to manufacture microconduit network structures, including: at least one mechanism having a set of electrospinning orifices to expel an effective amount of solution; at least one ground plane, wherein the orifices are maintained at a desired voltage to the grounding plane; a device that induces opposite electrical charges from the voltage to electrify jets of the solution and the jets of solution accelerate to and on the grounding plane transforming the solution into branched webs of filaments; at least one carrier substrate, wherein a mechanism deposits at least one interconnected branched webs of filaments on a carrier substrate; at least one dispensing mechanism; at least one matrix precursor fluid added into the branched webs of filaments from the dispensing mechanism; a device to solidify the matrix fluid; and a device that extracts or removes the branched webs of filaments from the matrix.

In embodiments of the invention, when the solution is utilized, it includes at least one of a polymer and at least one solvent. In embodiments, the solution includes at least polystyrene. Embodiments of the invention include, but not limited to, a matrix having a liquid non-solvent monomer. In other embodiments, the matrix includes, but is not limited to, at least one of thiol-enes (NOA81), ceramic precursor, metal-filled polymer, cyanate ester, acrylates, and silicones, and epoxies.

There are a variety of ways to extract or remove the matrix. Embodiments of the invention include, but are not limited to, the use of solvent(s), radiation, and/or heat depending on matrix and filament materials utilized. Embodiments of the invention include the matrix being solidified by a curing step. In other embodiments, the process further includes passing the webs by a dam. Still yet other embodiments further include at least one metering blade to control thickness of the liquid layer encapsulating the webs and to provide minimum of air entrapment wherein the matrix is solidified by a curing step. Of course the microconduit network structures produced by the process described in this application are other embodiments of the invention.

In embodiments, the interconnected web of filaments have diameters of about 10 nm to about 1 mm or 1000 nm to 1 mm. In other embodiments, the interconnected web of filaments have diameters ranging from about 900 nm to about 1 mm. Yet in other embodiments, the diameters range from about 100 nm to about 0.01 mm. In other embodiments, the process includes at least one dam to pass said webs by a dam. In other embodiments, the process includes at least one metering blade to control thickness of a liquid layer encapsulating said webs and to provide minimum of air entrapment. In other embodiments, the solution includes at least one polymer and at least one solvent. In other embodiments, the solution includes at least polystyrene.

The invention addresses the problem of incorporating a micro-porous network (an interconnected series of micron-sized channels) into a structural material, simultaneously maintaining 1) minimal overall porosity, which leads to minimal loss in strength and stiffness, and 2) maximum interconnectivity of the channels, which enables efficient transport of functional molecules and/or nanostructures within the system.

Step-by Step Description and Explanation of Embodiments of the Invention:

Embodiments of the invention include a microconduit network embedded within a solid matrix material and the method for producing a network at large scale continuously. The network is formed by electrospinning polymer solutions into a fibrous web with the special characteristic that most filaments share a branching connection to at least two other filaments, thereby forming a continuously connected network encompassing many filaments. The filament network serves as a template for the microconduit network. Once deposited, the filament network is encapsulated in a liquid matrix precursor material. The precursor may be polymeric (thermally or UV cured), ceramic, or liquid metal. The encapsulated filaments are then conveyed through a curing station, where temperature and/or UV radiation is used to convert the liquid encapsulant into a solid encapsulant. After passing through the curing station, the solid is washed with a solvent for the polymer filaments. Upon exposure to the solvent, the polymer filaments are dissolved away leaving behind a network of interconnected channels within the solid matrix. This arrangement is termed a microconduit network since the filaments are approximately micron-sized and form an interconnected network. The network is then sealed by placing removable protective films on either side. As formed, the material is capable of absorbing fluids laden with functional chemicals or nanoparticles by capillary action. The functional chemicals or nanoparticles may be altered at will by a procedure of flushing and refilling with any combination of fluids or nanoparticles.

A micro-porous network within a structure can act as a type of embedded circulatory system, enabling the transport throughout the structure of molecules and/or nanostructures that may be constructed and/or formulated to perform various functions, including, but not limited to, imparting camouflaging characteristics, monitoring the structure for evidence of chemical and biological attack, determining the extent of corrosion or fouling nearby the structure, receiving and transmitting electromagnetic signals, harvesting solar energy, producing or chemically converting fuels and other valuable liquid substances, or monitoring the health of individuals through contact with biological fluids. The functional molecules and/or nanostructures can not only be transported within the network, they may be patterned or re-patterned through the application of external magnetic fields, gravitational or centrifugal forces, or exposure to incident electromagnetic radiation.

In addition, the functional molecules and/or nanostructures may be supplied or re-supplied from an external store that is attached to the network from time to time, or they may be removed from the network by a washing process using an external store of fluid that is connected to the network from time to time. The ability to introduce or remove tailored sets of functional molecules and/or nanostructures provides the system with the characteristic of adaptive multi-functionality, that is, the functions that the system may perform can be altered at will. The ability to change the functionality of an object at will has been an important characteristic of systems, including desktop computer (laptops), or more recently, cellular telephones (smart phones), that exhibit rapidly increasing capabilities and rapidly decreasing costs of operation over time. By introducing similar capabilities into structural materials, similar rapid gains in functional capability and decreasing operational costs may be realized. The availability of these materials would enable the resultant systems to gain a rapid adaptation capability, which is presently absent in virtually all common structural materials.

A micro-porous network with the characteristics of an efficient circulatory system (minimal occupied volume of transport conduits, maximum rates of transport, and maximum penetration of conduits into the surrounding volume) is a complex structure. To fabricate a structure at the micron scale using conventional machining techniques would be extremely expensive and time-consuming. On the other hand, porous structures that are formed by other methods (often involving self-assembly or embedding of continuous template structures) typically involve features generated by numerous stochastic processes leading to interconnection patterns characterized by randomness. As a result, porous structures formed by these methods in which the pores occupy less than about 20% of any given volume tend to have few connections between pores, giving rise to poor transport characteristics. Since higher porosity almost always leads to substantial decreases in the strength and stiffness of structures, there is typically a highly constraining trade-off between the efficiency of transport and the loss of mechanical properties in porous structures formed by other processes.

Embodiments of the invention effectively circumvents the above trade-off by relying on the characteristics of electrospun fibers as porogens to produce a template structure that has a high degree of interconnectivity but a low occupied volume fraction. When a porous structure is produced by embedding the template in a matrix and then removing the template, the result is an interconnected network of micropores having a low occupied volume fraction. NAWCWD laboratory notebooks include all test results and data describing results of embodiments of the invention.

Another embodiment of the invention includes an example of a method/process embodiment include:

Turn on conveyor belt.
Turn on washing fluid removal system.
Turn on curing system.
Begin dispensing matrix precursor and washing fluids.
Begin dispensing protective film.
Apply voltage to electrospinner orifice.
Adjust metering blades, dispensing rates, electrospinning parameters, and curing system parameters as needed.
Begin collecting product.
Adjust all process parameters and refill fluid containers as necessary.
To shut down,
Stop collecting product
Adjust metering blades, dispensing rates, electrospinning parameters, and curing system parameters as needed.
Ramp applied voltage to zero (relative to ground plane) at electrospinner orifice.
Stop dispensing matrix precursor fluid.
Turn off curing system after last fluid has passed through and cured.
Stop dispensing protective film when last solid matrix passes by dispensers.
Stop dispensing wash fluid.
Turn off vacuum when last washing fluid has been collected.
Turn off conveyor belt.

As shown in FIGS. 1A-C, 2, and 3, at least one electrospinning orifices 18 are/is associated with the reservoir of a polymer solution (example: 20 wt % polystyrene in toluene).

The orifice(s) 18 are maintained at a voltage between 100 V and 100 kV relative to a grounding plane 24. The high voltage induces opposite electrical charges to accumulate on the ground plane 24 and on the tip of a fluid jets 20 that emerge from the orifices 18. Driven by the attractive force between the opposite electrical charges, the jets 20 accelerate towards the ground plane 24. The rapid motion of the jets 20 causes rapid evaporation of the solvent within them, leading to a decrease in the diameter of the jets 20, a process aided by the phenomenon of stable necking associated with accelerating fluids. As the diameter of the jets 20 becomes decreases to under 100 micrometers, repulsive forces between like charges at the tips of the jets 20 causes each jet to become mechanically unstable and to fragment into sub-jets 22 that accelerate away from one another. The sub-jets 22 then undergo a cascading fragmentation process, producing a branching pattern of fluid jets 22 with increasingly small diameter. The decreasing diameter further accelerates the drying process within each sub-jet, resulting in the formation of a solid filament of microscopic diameter. Because these filaments form from a substantially continuously branching network (there can be a fraction of a break) of fluid jets, they do not become completely separated one from another and some can join/mold/fuse together. Rather, as they reach the ground plane 24, they accumulate as a loose pile of dried filament webs 26. These piles of webs form a highly entangled series of interconnected filament networks. Electrospinning of polymer solutions has been described in detail in numerous publications for one skilled in the art to review which can be utilized in embodiments of the invention.

Figure 3:
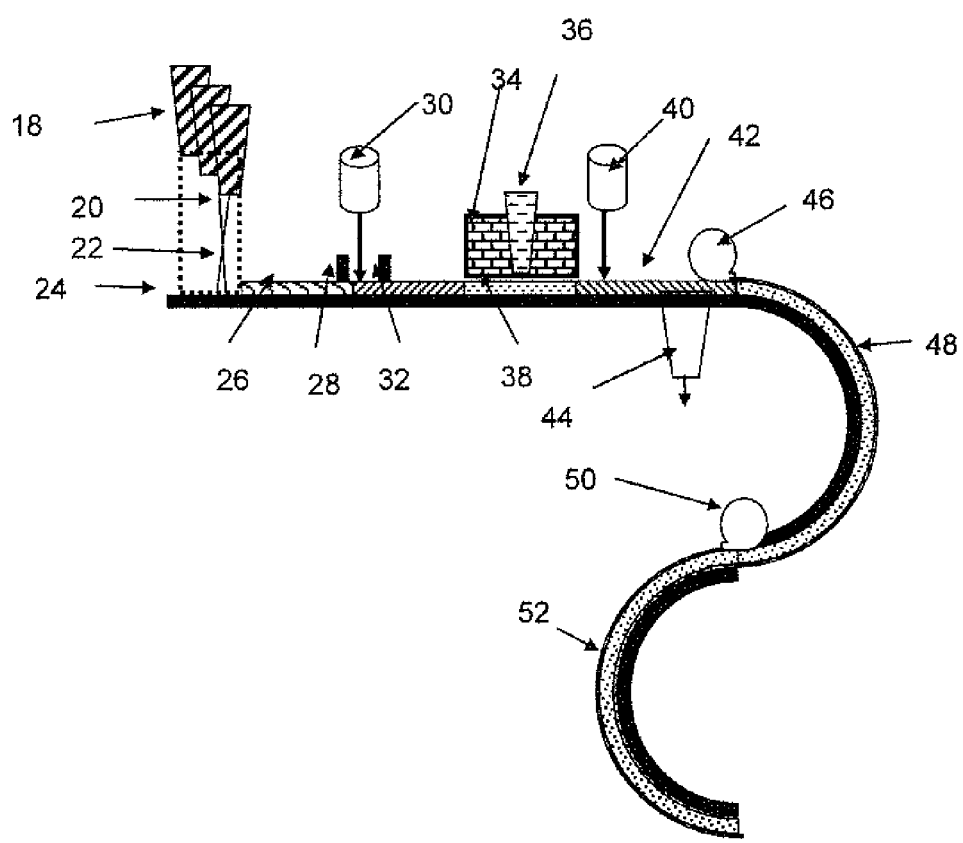
FIG. 3 is a side view of an embodiment of the invention illustrating the workings a producing an MCN, according to embodiments of the invention.

As shown in FIG. 3, the ground plane 24 forms part of a conveyor belt, which continuously removes the dried filament web 26 at a predetermined rate. This web serves as the soluble template for the microconduit network. The web then passes under a dam 28 and a dispenser for the matrix precursor fluid 30. The web then passes under a metering blade 32 that controls the thickness of the liquid layer encapsulating the web. The construct of the dam 28, dispenser 30, and metering blade 32 is such that encapsulation of the web is achieved with a minimum of air entrainment, a feature readily attainable to those skilled in the art. The precursor fluid dispensed by the dispenser 30 is of such a nature that it may be readily solidified, either by the application of heat causing a thermochemical cross-linking reaction (example, the dicyanate ester of bisphenol E catalyzed with 3 parts per hundred by weight of nonylphenol and 0.12 parts per hundred by weight of cobalt(II) acetylacetonate), the application of UV radiation leading to cross-linking (example, Norland Optical Adhesive NOA81, a commercially available thiol-ene-based system), or the application of cooling leading to freezing (example, polyethylene glycol). However, depending on the matrix materials utilized, other solidifying techniques can be used. The conveyor belt is then passed through an apparatus 34 consisting of a chamber in which the temperature and/or radiation fields of a controlled nature sufficient to achieve solidification within the residence time of the material on the conveyor belt.

Within this apparatus, there may be exhaust units 36 supplied for the purpose of removing byproducts of the solidification process. The encapsulated web 38 then exits the apparatus 34 as a solid slab of material with an embedded network of soluble polymer filaments. A washing fluid dispenser 40 then dispenses a solvent that can selectively dissolve the polymer filaments (example toluene for polystyrene), which comes into contact with the filaments. The dispensing apparatus 40 may include a cutting system for breaching the solid encapsulant in order to facilitate such contact. As contact with the solvent continues, the solid matrix 42 remains in-tact while encapsulating a web of liquid solution rather than a web of solid filaments, as the filaments dissolve. The conveyor then passes through a vacuum or other collection system 44 that forces the polymer solution out of the channels that have regions where the solid filaments once existed. The conveyor belt then passes under a dispenser 46 that introduces a protective film over the solid slab with a network of microscale conduits (herein referred to as a microconduit network). The side of the film that contacts the network may be coated with a removable adhesive, and/or with a fluid mixture, possibly having dispersed solid or liquid nanoparticles that can penetrate into the channels. The conveyor now carries a microconduit network 48 with a selected fluid possible introduced and one protective film cover. Through a series of contact rollers or other apparatus available to one skilled in the art, the uncoated side of the microconduit network is exposed and passed next to a second dispenser 50 that applies a protective film. As with the previously applied protective film, the side contacting the microconduit network may be coated with an adhesive and/or a penetrant fluid. Once applied, the final product(s) 52 of the microconduit network, with up to at least two penetrant fluids, coated on both sides by a removable protective barrier, is collected.

Variations on the aforementioned process easily produced by one skilled in the art could include the introduction of more than two types of penetrant fluid, introduction of multiple protective and/or adhesive layers, production of multi-layer microconduit network systems, production of microconduit networks in specifically defined spatial regions of a multi-component and/or multi-layer slab, cutting, stacking, separating, and/or adhering the slabs, in conjunction with possible adjustments to the solidification process, in order to create a microconduit network of any desired shape intermingled with a solid or fluid of any other desired shape, control of the diameter and density of the fibers comprising the template for the microconduit network, the use of multiple template materials, and the use of spatially selective filling processes.

One skilled in the art could also readily carry out operations including, but not limited to, flushing the microconduit network to remove a fluid or nanoparticle mixture, introduction of new and varying fluid and/or nanoparticle mixtures at will, combining of multiple fluid and/or nanoparticle mixtures, including combination with such mixtures previously existing within the network to create new mixtures, treatment of the surfaces of the walls of the conduits so as to favor introduction and transport of fluid and/or nanoparticle mixtures to within defined spatial regions of the network, blocking of the channels by introduction of particles with a pre-defined diameter falling within the range of the channel diameters, stretching of the matrix in conjunction with the use of elastically pliant matrix materials so as to alter the size and shape of conduits within the network, and/or manipulation of nanoparticles within the channels through the use of magnetic fields, directed beams of penetrating radiation, hydrostatic pressure fields, and/or dynamic mechanical fields (including ultrasonic acoustic pulses).

Embodiments of the invention have application to, but not limited to, re-configurable conformal antennas, re-configurable chemical and biological sensors, structural fuel storage and treatment, structural batteries, embedded photovoltaic devices, active camouflage, embedded computing, structural health monitoring, physiological health monitoring, embedded information displays, self-healing structures, chemical and biological decontamination equipment, chemical and biological protective equipment, and bandages.

The following prophetic examples are for illustration purposes only and not to be used to limit any of the embodiments. Embodiments of the invention include, but are not limited to, the following examples and ranges for Electrospun fiber MCN.

Examples of polymers that could be dissolved and electrospun into templates from solution include low density polyethylene, atactic polypropylene, polyvinyl chloride, polystyrene, substituted polystyrenes including poly-(alpha-methyl)styrene, polyamides including Nylon 6,6, Nylon 4,10, Nylon 6,10, Nylon 6,12, and proteins, cellulose and chemically modified cellulosic materials including cellulose acetate, poly(vinyl acetate), and polyesters including polyethylene terephthalate. Other materials utilized in embodiments of the invention involve polymers with good solubility in organic solvents, amorphous or slightly crystalline polymers, and polymers with low thermal stability. Yet other materials utilized include a molecular weight distribution that facilitates the electrospinning process by conferring mechanical stability to rapidly drawn and evaporated solutions at concentrations typical of the electrospinning process.

Examples of solvents that could be employed in the electrospinning process include pentanes, hexanes, heptanes, benzene, toluene, xylenes, ethylbenzene, acetone, methyl ethyl ketone, cyclopentanone, cyclohexanone, diethyl ether, tetrahydrofuran, isopropanol, n-butanol, n-pentanol, n-hexanol, ethylene glycol, propylene glycol, ethylene glycol diethyl ether, glycerol, dimethyl acetamide, dimethyl formamide, 1-methyl-2-pyrrolidone, dimethyl sulfoxide, anisole, veratroloe, cyclohexane, versions of these aforementioned wherein one or more hydrogen atoms is replaced by a F, Cl, or Br atom, and versions of n-propane, n-butane, and isobutene in which one or more hydrogen atoms is replaced by a F, Cl, or Br atom. Other solvents have a moderate vapor pressure at room temperature to 100° C. and are of low reactivity. In other embodiments of the invention, the electrospinning and rinsing solvents will be of the same or similar composition.

Examples of matrix materials include, but are not limited to, epoxy, cyanate ester, phthalonitrile, thermosetting polyimide, thermosetting polyester, phenolic, bismaleimide, and thiol-ene polymers, silica, titania, alumina, or other condensable ceramics, low melting point metals such as lead, castable or powdered metal or ceramic particles with polymeric binders, or other free-flowing material compositions capable of penetrating micron-sized regions. Examples of liquids added to the microconduits include, but are not limited to, water, dimethyl formamide, 1-methyl-2-pyrrolidone, ethylene carbonate, propylene carbonate, naphthalene, mineral oil, silicone oil, diphenyl ether, or other non-volatile liquids, any of the solvents listed previously, or any combination thereof.

Examples of functional molecules incorporated into the microconduits include dyes colorants, reactive monomers, chemical sequestration agents, fluorescent markers, lipids, proteins, biocides, clotting agents, detergents, and surfactants (including, but not limited to Coumarin and Rhodamine). Examples of nanoparticles incorporated into the microconduits include functionalized or unfunctionalized silica, alumina, titania, gold, silver, zeolites, graphites, boron nitride, silsesquioxanes, fullerenes, cobalt, and iron oxide (eg. hematite), amorphous or of any practically attainable crystal polymorph, and in any combination including particles with multiple chemical and/or crystal polymorph components. Electrospinning, conveyor belt, curing, rinsing, and any needed drying steps are carried out at temperatures (typically 20-100° C. for all steps except curing, which may range from 20-300° C., with a possible range of −200-200° C. for all steps except curing, and −20 to 400° C. for curing, and required voltage levels (typically 1000-10,000 V, but ranging from 100 to 100,000 V), polymer concentrations (typically 5-25 vol %, but possibly 0.1-100 vol %, the polymers can be molten rather than in solution), and conveyor speeds (typically 10 cm/min-100 cm/min, but possibly 0.1 cm/minute to 10,000 cm/min), film thicknesses (typically 0.1-1 mm, but possibly 0.001 mm-100 mm), determined using methods familiar to one skilled in the art. The process may involve typically 1-10 electrospinning orifices, but could involve 1-10,000 orifices, and a line width of typically 5-50 mm but possibly 0.1 mm-10,000 mm.

The process could be a continuous or a batch process. Necessary production machinery, packaging, finishing, refilling, and other maintenance operations can be added as determined by one skilled in the art. Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:
1. An apparatus to manufacture microconduit network structures, comprising:
   at least one mechanism having a set of electrospinning orifices to expel an effective amount of solution;
   at least one ground plane, wherein said orifices are maintained at a desired voltage to said grounding plane;
   a device that induces opposite electrical charges from said voltage to electrify jets of said solution and said jets of solution accelerate to and on said grounding plane transforming said solution into branched webs of filaments;
   at least one carrier substrate, wherein a mechanism deposits at least one interconnected branched webs of filaments on said carrier substrate;
   at least one dispensing mechanism for dispensing at least one matrix precursor fluid added into said interconnected branched webs of filaments;
   a device to solidify said matrix fluid; and a device that extracts or removes said interconnected branched webs of filaments from said matrix fluid after solidification.

\* \* \* \* \*